United States Patent Office 3,198,834
Patented Aug. 3, 1965

3,198,834
OPTICAL ISOMERS OF TRIFLUOROMETHYL-
ATED PHENETHYLAMINES
Laszlo G. Beregi, Boulogne-sur-Seine, Pierre Hugon,
Rueil-Malmaison, Jean-Claude Le Douarec, Versailles,
and Henri Schmitt, Paris, France, assignors to Societe
en nom Collectif dite: "Science Union et Cie, Societe
Francaise de Recherche Medicale," Suresnes, Seine,
France, a French society
No Drawing. Filed July 27, 1964, Ser. No. 385,597
5 Claims. (Cl. 260—570.8)

This application is a continuation-in-part of our co-pending application Serial No. 149,190, filed November 1, 1961. The invention relates to resolving optical isomers of trifluoromethylated phenethylamine derivatives of the following formula:

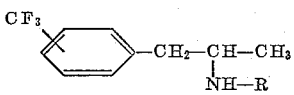

wherein R is a lower-alkyl radical having up to a maximum of 5 carbon atoms, to the optical isomers thereby obtained, and to a method for the use of such isomers.

It is known that racemic N-ethyl-alpha-methyl-phenethylamine is very resistant to conventional resolution procedures. Thus, when dextro-rotatory tartaric acid, $l$-glutamic acid, $d$-aspartic acid, $l$-mandelic acid, $d$-alpha-methoxyphenyl acetic acid, and dextro-rotatory 10-camphosulfonic acid were employed, the attempted resolution failed; cf., British Patent 814,339.

The presence of the trifluoromethyl group on the benzene nucleus makes the problem even more difficult in that it increases the solubility of the diastereo isomeric salts in polar solvents.

We have now found that the levo-rotatory form of 1-(meta-trifluoromethylphenyl)-2 - ethylaminopropane can rather surprisingly be directly obtained from the racemic form using $d$-dibenzoyltartaric acid while the dextro-rotatory form requires a combined utilization of both $d$-dibenzoyltartaric acid and $d$-camphoric acid.

The obtention of the different 1-(meta-trifluoromethylphenyl)-2 N-alkylaminopropanes in dextro and levo-rotatory form can be readily caried out, by acetylating with an anhydride or an ester followed by reduction of the appropriate optically active 1-(meta-trifluoromethylphenyl)-2-aminopropane. The same is true of the corresponding ortho and para-trifluoromethyl derivatives. This procedure is illustrated by Example 2.

It is an object of the invention to provide dextro-rotatory trifluoromethylated N-alkyl-alpha-methyl-phenethylamine substantially free from its levo-rotatory optical antipode.

The present invention further provides levo-rotatory trifluoromethylated N-alkyl-alpha-methyl-phenethylamine in a very pure form, also free from its opposite optical antipode.

The optically active $d$ and $l$ isomers of the various trifluoromethylated N-alkyl-alpha-methyl-phenethylamines in crystalline and substantially pure form and substantially free one from the other, are bases, which react with organic and inorganic acids to produce the corresponding acid addition salts, which have the same activities and are useful for the same purposes as the free bases.

Among the acids able to form such salts, the following may be illustratively cited: hydrohalic acids, sulfuric acid, phosphoric acid, nitric acid, perchloric acid, formic acid, acetic acid, propionic acid, oxalic acid, succinic acid, glycolic acid, lactic acid, maleic acid, tartaric acid, benzenesulfonic acid, phenylacetic acid, benzoic acid, p-aminobenzoic acid, toluenesulfonic acid, naphthalenesulfonic acid, sulfanilic acid, tannic acid and alginic acid. The same salts may be formed of the ortho-, meta-, and para-trifluoromethyl optical isomers and their activities are found to be the same, although the meta compound isomers are preferred.

The invention is illustrated by the following examples without, however, being limited thereto.

Example 1

To a solution of 160 parts of $d$-dibenzoyltartaric acids in 1600 parts of anhydrous ethanol were added, over a period of 15 minutes, 80 parts of $dl$-1-(metatrifluoromethylphenyl)-2-ethylaminopropane. After 15 additional minutes, 90.5 parts of crystalline solid were isolated.

When this product was recrystallized from 1300 parts of anhydrous ethanol, there was obtained 70 parts of the dibenzoyl $d$-tartarate acid salt of $l$-1-(metatrifluoromethylphenyl)-2-ethylaminopropane.

The salt obtained as described above was treated with 500 parts of 4 N aqueous sodium hydroxide solution. The mixture was extracted with two 200-part portions of diethyl ether and the ether extract was re-extracted with 100 parts of 4 N hydrodiboric acid. After treatment with 120 parts of 4 N aqueous sodium hydroxide solution, the free amine amounting to 25 parts distills at 105–107° C. (17.5 mm.). Rotation $(\alpha)_D^{25}$: −9.6° (c., 8% in $C_2H_5OH$).

The $l$-1-(meta-trifluoromethylphenyl)-2-ethylaminopropane hydrochloride melted at 160–161° C. (from ethyl acetate).

The resolution liquors were concentrated to dryness under reduced pressure. The amorphous solid was suspended in 250 ml. of water and there was added to the suspension 500 parts of 4 N aqueous sodium hydroxide solution. The mixture was extracted with two 250-part portions of diethyl ether. After acidification with 100 parts of 4 N hydrochloric acid and separation, the aqueous layer was treated with 120 parts of 4 N aqueous sodium hydroxide solution and finally extracted with two 250-part portions of diethyl ether. The extract was dried over $MgSO_4$ and then freed of diethyl ether by distillation. Rotation of the residue (30 parts) after vacuum distillation gave an $(\alpha)_D^{25}$ of +7.1 (c., 8% in $C_2H_5OH$).

17 parts of the crude amine obtained above were added to 17 parts of $d$-camphoric acid dissolved in 160 parts of anhydrous ethanol. After 3 hours, 20 parts of precipitate separated which was recrystallized from 120 parts of anhydrous ethanol. This $d$-camphorate acid salt of $d$-1-(meta-trifluoromethylphenyl)-2 - ethylaminopropane, after treatment as described above for the levo-isomer, gave 9 parts of the desired amine. Rotation $(\alpha)_D^{25}$: +9.5 (c., 8% in $C_2H_5OH$).

The $d$-1-(meta-trifluoromethylphenyl)-2-ethylaminopropane hydrochloride melted at 160–161° C. (from ethyl acetate).

Example 2

[$d$-1-(meta-trifluoromethylphenyl)-2-aminopropane$(\alpha)_D^{25}$: +21.5 (c. 8%, $C_2H_5OH$)]

Eight parts were acetylated at 40° C. with 11 parts of acetic anhydride. After 30 minutes, the mixture of this starting amine was poured into two parts of water and neutralized with 16 parts of $Na_2CO_3$. After extracting with 100 parts of diethyl ether, the ether extract was dried over $MgSO_4$, and the so-obtained acetylamino-derivative was reduced with 1.7 parts of lithium aluminum hydride (refluxing 3 hours). After hydrolyzing and extracting with diethyl ether, there were obtained 3 parts of $d$-1-(meta - trifluoromethylphenyl) - 2 - ethylaminopropane; $(\alpha)_D^{25}$+9.6° (c. 5.7 in $C_2H_5OH$).

Four parts of $l$-1-(meta-trifluoromethylphenyl)-2-ethylaminopropane; $(\alpha)_D^{25}$−9.5° (c. 8% in $C_2H_5OH$), were obtained in the same manner from $l$-1-(meta-trifluoromethylphenyl)-2-aminopropane.

The optically active $d$ and $l$ isomers of the present invention possess several useful pharmacological and therapeutical properties, in some ways quite different from those of the corresponding racemic mixtures.

In our application Serial No. 149,190, we described anoretic and sedative activity of the corresponding racemic mixtures.

It was found that dextro and levo rotatory isomers are in many aspects quite different one from the other and from the racemic mixtures, mainly in the following relationship:

Their $LD_{50}$, determined by the method of C. S. Weil (Biometrics 249, 1952) in mice, was found to be 120 mg./kg. I.P. for the $d$ form, and 210 mg./kg. I.P. for the $l$ form of 1-(m-$CF_3$-phenyl)-2-ethylaminopropane.

On the spontaneous motor activity, there does not seem to be any significant difference between the isomers when tested in rats. Both depress this activity at a dosage level of 4 mg./kg. I.P., while amphetamine increases it at the same dose.

On non-anesthetized rabbits the $l$ isomers seem to have a more pronounced sedative action on the behaviour and this is confirmed by electrocorticographic investigations, where appear slow waves of high voltage, characteristic for CNS depressants, with the $l$ isomers, while no modifications are observed with the $d$ isomers and the racemic mixture.

The anorexigenic effect of the $d$ isomer is about 3 times greater than that of the $l$ isomer. 2.5 mg./kg. of $d$-1-(m-$CF_3$-phenyl)-2-ethylaminopropane inhibits 50% of the food intake of rats, while 7 mg./kg. of the $l$ isomer is necessary to obtain the safe effect.

It was found also unexpectedly that the loss of weight of animals, after repeated administration of isomers of the invention, is not only the consequence of anorexia, but also of a high lipolytic action.

After daily administration of isomers during 10 days to rats, a decrease of 30% of epididymic lipid reserves was registered with 15 mg./kg. of $d$-1-(m-$CF_3$-phenyl)-2-ethylaminopropane and with 40 mg./kg. of the corresponding $l$ isomers. Here also $d$ isomers seem to be 3 times more potent than $l$ isomers, while the corresponding racemic mixture has an intermediate activity of 30 mg./kg.

Action on the blood pressure shows perhaps the most important difference existing between the optical isomers. The $d$ isomer of 1-(m-$CF_3$-phenyl)-2-ethylaminopropane increases blood pressure at a dosage level of 5 mg./kg. in dogs an average of 120 mm. Hg, whereas the $l$ isomer decreases it an average of 25 mm. Hg, at the same dose.

The difference in analgesic activity of the isomers is also pronounced. When tested by the hot plate method in mice, the $d$ isomer was found to be twice as active as the $l$ isomer of the same compound 1-(m-$CF_3$-phenyl)-2-ethylaminopropane. The dose increasing the threshold of pain perception 80% is 5.6 mg./kg. for the first ($d$) and 10.5 for the second ($l$).

The optically active isomers of the invention have also pronounced mydriatic effect, but to a remarkably different extent, and there also the $d$ isomers seem to be more potent. 8.8 mg./kg. of the $d$ isomer of the above compound increases the pupil diameter in standard tests to double its original value, while a dose of 24 mg./kg. is necessary to obtain the same effect with the $l$ isomer.

Thus, optically active $d$ and $l$ isomers of 1-(m-trifluoromethylphenyl)-2-alkylaminopropane compounds may be used for therapy of warm blooded animals and may be administered to a living animal body alone or in admixture with usual solid and liquid pharmaceutical carriers, for example, in tablet, suspension, solution, oral, suppository or injection form. They are particularly interesting as anorexigenic, CNS depressant, analgesic and hypo or hypertensive drugs depending upon the optical isomer selected at doses from about 5 mg. to 50 mg.

Various modifications and equivalents will be apparent to one skilled in the art, and may be made in the compounds, compositions, methods, and procedure of the present invention without departing from the spirit or scope thereof, and it is therefore understood that the invention is to be limited only by the scope of the appended claims.

What we claim is:

1. An optically active isomer, selected from the group consisting of the $d$ and $l$ isomers of (I) a compound having the following formula:

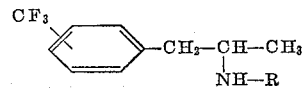

wherein R is a lower-alkyl radical having up to a maximum of 5 carbon atoms, and (II) an acid addition salt thereof, 2. $d$-1-(m-trifluoromethyphenyl)-2-ethylaminopropane.
3. An acid addition salt of a compound of claim 2.
4. $l$-1-(m-trifluoromethylphenyl)-2-ethylaminopropane.
5. An acid addition salt of a compound of claim 4.

References Cited by the Examiner
UNITED STATES PATENTS

| | | | |
|---|---|---|---|
| 3,044,932 | 7/62 | Tazelaar et al. | 167—55 |
| 3,078,307 | 2/63 | Craig et al. | 260—570.8 |
| 3,084,099 | 4/63 | Hays et al. | 167—55 |
| 3,117,160 | 1/64 | Holland | 260—570.8 |

CHARLES B. PARKER, *Primary Examiner.*